(12) United States Patent
Zhang et al.

(10) Patent No.: US 11,574,152 B2
(45) Date of Patent: Feb. 7, 2023

(54) RECOGNITION SYSTEM FOR SECURITY CHECK AND CONTROL METHOD THEREOF

(71) Applicant: POLIXIR TECHNOLOGY CO., LTD., Nanjing (CN)

(72) Inventors: Zongzhang Zhang, Suzhou (CN); Haoran Chen, Suzhou (CN); Yishen Wang, Suzhou (CN); Yongliang Shen, Suzhou (CN)

(73) Assignee: POLIXIR TECHNOLOGY CO., LTD., Nanjing (CN)

( * ) Notice: Subject to any disclaimer, the term of this patent is extended or adjusted under 35 U.S.C. 154(b) by 416 days.

(21) Appl. No.: 16/896,367

(22) Filed: Jun. 9, 2020

(65) Prior Publication Data

US 2020/0302248 A1   Sep. 24, 2020

Related U.S. Application Data

(63) Continuation of application No. PCT/CN2018/078738, filed on Mar. 12, 2018.

(30) Foreign Application Priority Data

Jan. 18, 2018   (CN) .......................... 201810048208.9

(51) Int. Cl.
*G06K 9/62* (2022.01)
*G06V 20/20* (2022.01)
(Continued)

(52) U.S. Cl.
CPC ......... *G06K 9/6282* (2013.01); *G06K 9/6259* (2013.01); *G06K 9/6263* (2013.01); *G06N 3/049* (2013.01); *G06V 20/20* (2022.01)

(58) Field of Classification Search
CPC .. G06K 9/6282; G06K 9/6259; G06K 9/6263; G06N 3/049; G06N 3/08;
(Continued)

(56) References Cited

U.S. PATENT DOCUMENTS

2017/0357879 A1* 12/2017 Odaibo .................... A61B 3/14
2018/0121804 A1*  5/2018 Mohamadi ........... G06V 10/143
(Continued)

FOREIGN PATENT DOCUMENTS

| CN | 106295637 A | 1/2017 |
| CN | 107403426 A | 11/2017 |
| CN | 107423813 A | 12/2017 |

*Primary Examiner* — John W Lee
(74) *Attorney, Agent, or Firm* — SZDC Law P.C.

(57) ABSTRACT

The recognition system for security check and control method thereof. The recognition system for security check is integrated with a reinforcement learning algorithm and an attention region proposal network. The recognition system for security check comprises the following modules: an object feature extraction module (1); a dangerous item region segmentation module (2); a preliminary classification module (3); a preliminary classification result determination module (4); and a fine-grained recognition module (5). In the invention, optimization of a dangerous item region segmentation module and provision of a fine-grained recognition module greatly improve accuracy and efficiency of security check, shorten the duration of security check, alleviate congestion, save labor, and reduce pressure on security check personnel.

4 Claims, 5 Drawing Sheets

(51) Int. Cl.
*G06N 3/04* (2006.01)
*G06N 3/08* (2006.01)
*G06N 5/00* (2006.01)
*G06N 20/00* (2019.01)
*G06V 10/50* (2022.01)
*G06V 20/52* (2022.01)

(58) Field of Classification Search
CPC ...... G06N 5/003; G06N 20/00; G06N 3/0454; G06V 20/20; G06V 10/507; G06V 20/52; G01N 23/04; G01N 2223/1016; G01N 2223/401; G01N 2223/421; G01V 5/0016
See application file for complete search history.

(56) References Cited

U.S. PATENT DOCUMENTS

2018/0188738 A1* 7/2018 Tatourian ............. G05D 1/0274
2018/0196158 A1* 7/2018 Fu ........................ G01V 5/0016

* cited by examiner

| Block0 | 7 × 7, 64, 2 stride<br>3 × 3, max-pooling, 2 stride |
|---|---|
| Block1 | $\begin{bmatrix} 1 \times 1, & 64 \\ 3 \times 3, & 64 \\ 1 \times 1, & 256 \end{bmatrix} \times 3$ |
| Block2 | $\begin{bmatrix} 1 \times 1, & 128 \\ 3 \times 3, & 128 \\ 1 \times 1, & 512 \end{bmatrix} \times 4$ |
| Block3 | $\begin{bmatrix} 1 \times 1, & 256 \\ 3 \times 3, & 256 \\ 1 \times 1, & 1024 \end{bmatrix} \times 6$ |
| Block4 | $\begin{bmatrix} 1 \times 1, & 512 \\ 3 \times 3, & 512 \\ 1 \times 1, & 2048 \end{bmatrix} \times 3$ |

RECOGNITION SYSTEM FOR SECURITY CHECK AND CONTROL METHOD THEREOF

CROSS-REFERENCE TO RELATED APPLICATIONS

This application is the Bypass Continuation Application of PCT/CN2018/078738, filed on Mar. 12, 2018, which claims priority of Chinese Patent Application No. 201810048208.9, filed Jun. 18, 2018, entitled "RECOGNITION SYSTEM FOR SECURITY CHECK AND CONTROL METHOD THEREOF," the entire disclosures of which are incorporated herein by reference.

FIELD OF THE INVENTION

The disclosure belongs to the technical field of object recognition technology, and particularly relates to a recognition system for security check and a control method thereof.

DESCRIPTION OF THE PRIOR ART

With the increasing awareness of security, security inspection devices have been installed in important areas such as subway stations, railway stations, and airports. At present, the recognition of dangerous items is mainly based on manual recognition. Such a method of recognition needs to train the staff, and the accuracy cannot be guaranteed, so the situation of missed judgment and misjudgment is prone to occur. In addition, people in subway stations and other areas are densely populated, relying on manual recognition will lead to low the efficiency of security screening. Therefore, an efficient automated security recognition system is needed.

SUMMARY OF THE INVENTION

An exemplary embodiment of the disclosure aims to provide a recognition system for security check and a control method thereof, so as to improve the accuracy of security check and case efficiency.

To achieve the foregoing objective, the present invention is realized as the recognition system for security check constituted as follows. The recognition system for security check is integrated with a reinforcement learning algorithm and an attention region proposal network, the recognition system for security check comprising the following modules:

Object feature extraction module: image scanning an object by using an X-ray machine to obtain an original image, and inputting the original image into a convolutional neural network to extract an object feature to obtain feature map of the object;

Dangerous item region segmentation module: using windows to represent the dangerous item region and using tree-based reinforcement learning algorithm; take the original image as the root of the tree, and take two types of actions as the branches of the tree to obtain two windows that form a tree structure; take the two windows as the root of the tree, and take two types of actions as branches of the tree to obtain four windows, and so on, until the windows show all the dangerous item regions;

Preliminary classification module: combining the feature map of the object with the dangerous item region to obtain feature map of the dangerous item region, and then processing the feature map of the dangerous item region and inputting processing result into a classifier to obtain classification probability value of the dangerous item and preliminary classification results;

Preliminary classification result determination module: threshold of the classification probability is preset in the recognition system for security check, judging the precision of the preliminary classification results and comparing the corresponding classification probability value with the threshold;

Fine-grained recognition module: if the classification probability value is lower than the threshold, recognizing the object in a fine-grained way, and using tree-based reinforcement learning algorithm to segment the region with more obvious features in the dangerous item region to form attention region; processing feature map of the attention region and input into the classifier to obtain classification probability.

Further, the convolutional neural network comprises a large convolution kernel for increasing the region of the receptive field so as to make the extracted object features more comprehensive for accurate learning, a small convolution kernel for accurately learning object edges and other detail features and reducing a large number of redundant parameters, and a convolution filter for deepening and widening the dimensionality reduction of network structure.

Further, in the preliminary classification module, the feature map of the dangerous item region is input to a pooling layer for processing, and the classifier includes softmax function.

Further, the fine-grained recognition module uses a recurrent attention region generation network, and continue to segment according to the attention region and classification probability to form a more detailed attention region and generate the classification probability, continues to iterate until the predetermined target or upper limit of the number of cycles is reached, and the loop is stopped to obtain the final recognition result.

To achieve the foregoing objective, the present invention is also realized as a control method of the recognition system for security check completed as follows. The control method comprises the following steps:

S1: acquiring a scanned image of the object to generate an original image, and inputting the original image into a convolutional neural network to extract an object feature to obtain a feature map of the object;

S2: using windows to represent dangerous item region and using tree-based reinforcement learning algorithm; take the original image as the root of the tree, and take two types of actions as the branches of the tree to obtain two windows that form a tree structure; take the two windows as the root of the tree, and take two types of actions as branches of the tree to obtain four windows, and so on, until the windows show all the dangerous item regions;

S3: combining the feature map of the object with the dangerous item region to obtain feature map of the dangerous item region, and then processing the feature map of the dangerous item region and inputting processing result into a classifier to obtain classification probability value of the dangerous item and preliminary classification results;

S4: threshold of the classification probability is preset in the recognition system for security check, judging the precision of the preliminary classification results and comparing the corresponding classification probability value with the threshold;

S5: if the classification probability value is lower than the threshold, recognizing the object in a fine-grained way, and using tree-based reinforcement learning algorithm to segment the region with more obvious features in the dangerous item region to form attention region; processing feature map of the attention region and input into the classifier to obtain classification probability.

Further, the convolutional neural network comprises a large convolution kernel for increasing the region of the receptive field so as to make the extracted object features more comprehensive for accurate learning, a small convolution kernel for accurately learning object edges and other detail features and reducing a large number of redundant parameters, and a convolution filter for deepening and widening the dimensionality reduction of network structure.

Further, in the step "S2", the feature map of the dangerous item region is input to a pooling layer for processing, and the classifier includes softmax function.

Further, in the step "S5", using a recurrent attention region generation network, and continue to segment according to the attention region and classification probability to form a more detailed attention region and generate the classification probability, continues to iterate until the predetermined target or upper limit of the number of cycles is reached, and the loop is stopped to obtain the final recognition result.

Further, the dangerous items are divided into several levels according to the danger index, and the danger index of the dangerous item can be adjusted to meet different security inspection standards in use.

Further, collecting dangerous item images, frame selecting, classifying, and divided into a training set and a verification set according to a ratio of 9:1, a complete network is trained after several iterations.

The beneficial effect of the foregoing technical solution is: the dangerous items are detected in more detail by providing a fine-grained recognition module in the system, which greatly improves the accuracy of the security check is. And accurately recognizing the dangerous items by reducing the unpacking inspection as much as possible improves the efficiency of security inspection, shortens the security inspection time, alleviates the congestion situation, saves human resources, and reduces the work pressure of security inspection staff.

The above description is only an outline of the technical schemes of the present invention. Preferred embodiments of the present invention are provided below in conjunction with the attached drawings to enable one with ordinary skill in the art to better understand said and other objectives, features, and advantages of the present invention and to make the present invention accordingly.

DETAILED DESCRIPTION OF THE PREFERRED EMBODIMENTS

Some embodiments of the present invention are described in detail below. However, in addition to the descriptions given below, the present invention can be applied to other embodiments, and the scope of the present invention is not limited by such, rather by the scope of the claims.

Figure 1:
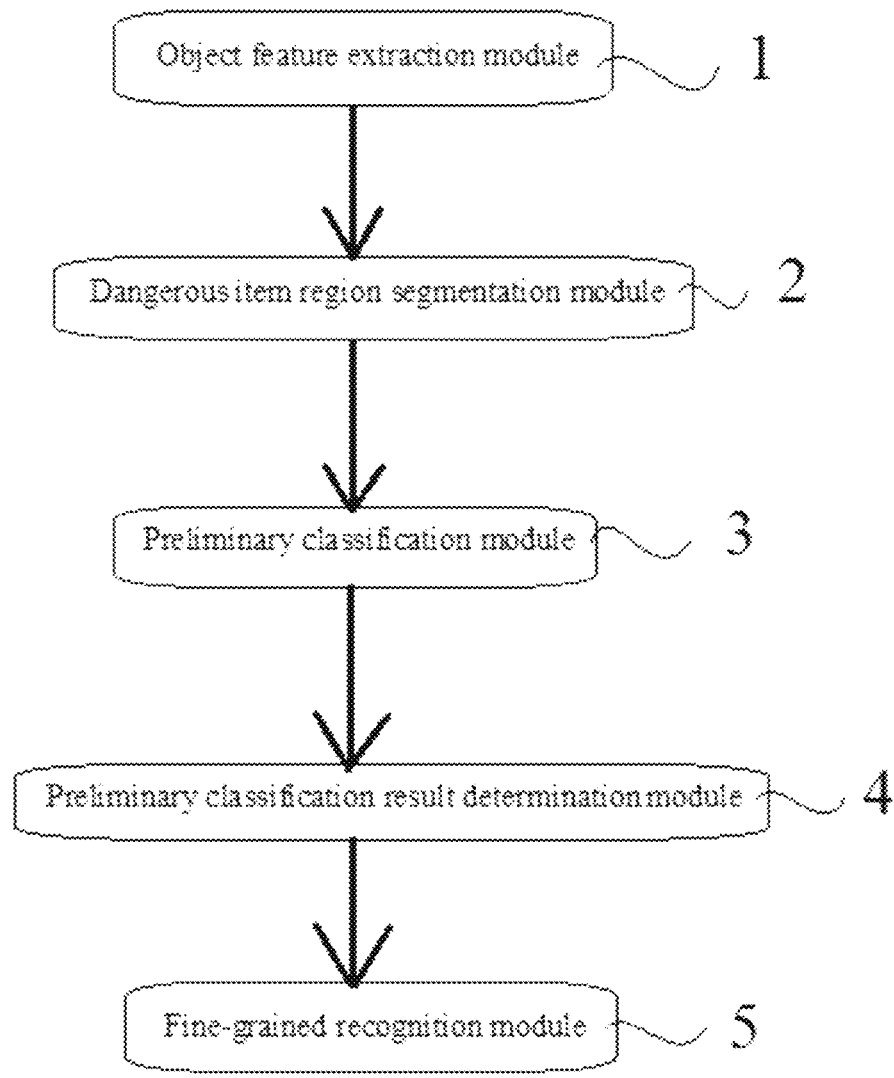
FIG. 1 is a module diagram depicting the recognition system for security check of the present invention.
Figures 3, 4:
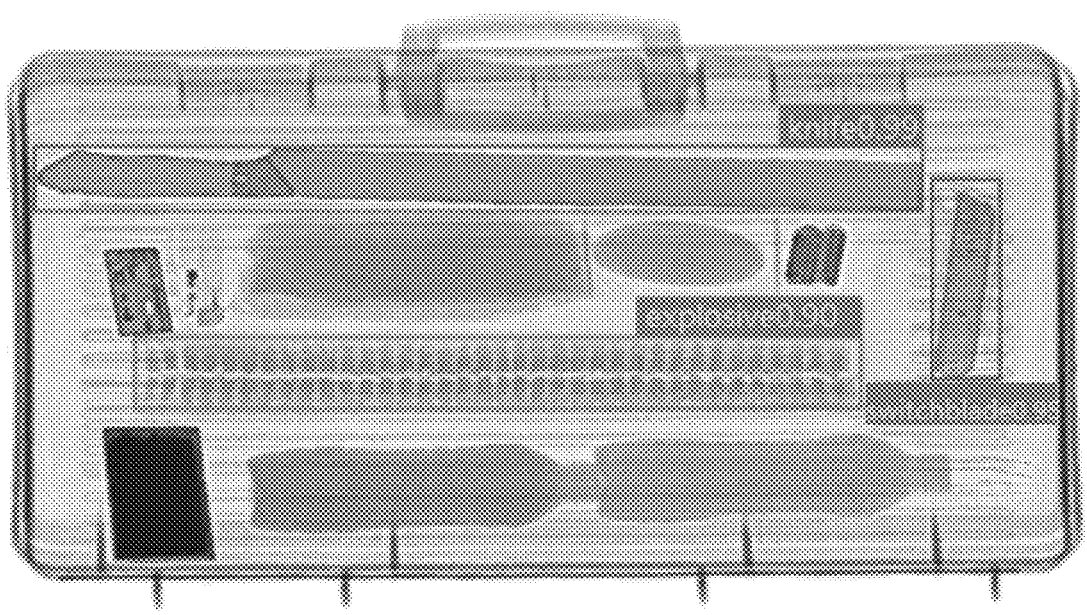
FIG. 3 is a schematic diagram depicting the processing result of the recognition system for security check of the present invention.
FIG. 4 is a schematic diagram depicting the structure of the convolutional neural network.

Referring to FIG. 1 and FIG. 3, the recognition system for security check in the preferred embodiment of the present invention is integrated with a reinforcement learning algorithm and an attention region proposal network, the recognition system for security check comprising the following modules:

Object feature extraction module 1: image scanning an object by using an X-ray machine to obtain an original image, and inputting the original image into a convolutional neural network to extract an object feature to obtain a feature map of the object. Referring to FIG. 4, in this embodiment, the convolutional neural network comprises a 7×7 large convolution kernel for increasing the region of the receptive field so as to make the extracted object features more comprehensive for accurate learning, a 3×3 small convolution kernel for accurately learning object edges and other detail features and reducing a large number of redundant parameters, and a 1×1 convolution filter for deepening and widening the dimensionality reduction of network structure. The specific configuration of the convolutional neural network is as follows:

The structure of the convolutional neural network is divided into five blocks (Block0 to Block4). Exception for Block0, the other four blocks all contain the residual learning unit, and the entire network contains a total of 16 residual learning units. The residual learning unit is composed of three convolutional layers, wherein the size of the convolution kernel of the first convolutional layer is 1×1, the size of the convolution kernel of the second convolutional layer is 3×3, and the size of the convolution kernel of the third convolutional layer is 1×1. The size of the final output feature map of the convolutional neural network is 7×7× 2048 (the size is 7×7, the number of output channels is 2048, the same below). The following is the specific configuration of each block:

Block0: The input of this block is the original image. This block consists of a convolutional layer and a pooling layer. In the convolutional layer, the convolution kernel size is 7×7, the number of output channels is 64, and the stride is 2. The convolutional layer is followed by the pooling layer. In the pooling layer, the pooling size is 3×3, the pooling stride is 2, and using the max-pooling algorithm. The output of this block is used as the input of the next block (Block1).

Block1: The input of this block is the output of the previous block (Block0). This block consists of three residual learning units. In the first residual learning unit, the number of output channels of the first layer is 64, the stride is 1, the number of output channels of the second layer is 64, the stride is 1, and the number of output channels of the third layer is 256, and the stride is 1; the configuration of the second residual learning unit is the same as the first one; in the third residual learning unit, the number of output channels of the first layer is 64, the stride is 1, the number of output channels of the second layer is 64, the stride is 2, and the number of output channels of the third layer is 256, the stride is 1. The output of this block is used as the input of the next block (Block2).

Block2: The input of this block is the output of the previous block (Block1). This block consists of four residual learning units. In the first residual learning unit, the number of output channels of the first layer is 128, the stride is 1, the number of output channels of the second layer is 128, the stride is 1, and the number of output channels of the third layer is 512, and the stride is 1; the configuration of the second and third residual learning units are the same as the first one; in the fourth residual learning unit, the number of output channels of the first layer is 128, the stride is 1, the number of output channels of the second layer is 128, the stride is 2, the number of output channels of the third layer is 512, the stride is 1. The output of this block is used as the input of the next block (Block3).

Block3: The input of this block is the output of the previous block (Block2). This block consists of six residual learning units. In the first residual learning unit, the number of output channels of the first layer is 256, the stride is 1, the number of output channels of the second layer is 256, the stride is 1, and the number of output channels of the third layer is 1024, the stride is 1; the configuration of the second, the third, the fourth, and the fifth residual learning units are the same as the first one; in the sixth residual learning unit, the number of output channels of the first layer is 256, the stride is 1, the number of output channels of the second layer is 256, the stride is 2, the number of output channels of the third layer is 1024, and the stride is 1. The output of this block is used as the input for the next block (Block4).

Block4: The input of this block is the output of the previous block (Block3). This block consists of three residual learning units. In the first residual learning unit, the number of output channels of the first layer is 512, the stride is 1, the number of output channels of the second layer is 512, the stride is 1, and the number of output channels of the third layer is 2048, the stride is 1; the configuration of the second and the third residual learning units are the same as the first one.

Dangerous item region segmentation module 2: using windows to represent the dangerous item region and using tree-based reinforcement learning algorithm; take the original image as the root of the tree, and take two types of actions as the branches of the tree to obtain two windows that form a tree structure; take the two windows as the root of the tree, and take two types of actions as branches of the tree to obtain four windows, and so on, until the windows show all the dangerous item regions. The dangerous items are divided into several levels according to the danger index, and the danger index of the dangerous item can be adjusted to meet different security inspection standards in use. Collecting dangerous item images, frame selecting, classifying, and divided into a training set and a verification set according to a ratio of 9:1, a complete network is trained after several iterations.

Preliminary classification module 3: combining the feature map of the object with the dangerous item region to obtain the feature map of the dangerous item region, and then processing the feature map of the dangerous item region and inputting processing result into a classifier to obtain classification probability value of the dangerous item and preliminary classification results. In this embodiment, the feature map of the dangerous item region is input to a pooling layer for processing, and the classifier includes softmax function. The function of the pooling layer is to optimize features to reduce the interference from unnecessary features. In this embodiment, the max-pooling algorithm is used to select the maximum feature value for output in a region of 3×3, which makes the extracted features have generalization ability such as translational rotation invariance, so as to improve the recognition accuracy. The operation of this layer does not change the dimension of the feature map.

Preliminary classification result determination module 4: threshold of the classification probability is preset in the recognition system for security check, judging the precision of the preliminary classification results and comparing the corresponding classification probability value with the threshold.

Fine-grained recognition module 5: if the classification probability value is lower than the threshold, recognizing the object in a fine-grained way, and using tree-based reinforcement learning algorithm to segment the region with more obvious features in the dangerous item region to form attention region; processing feature map of the attention region and input into the classifier to obtain classification probability. The fine-grained recognition module 5 uses a recurrent attention region generation network, and continue to segment according to the attention region and classification probability to form a more detailed attention region and generate the classification probability, continues to iterate until the predetermined target or upper limit of the number of cycles is reached, and the loop is stopped to obtain the final recognition result.

Figure 2:
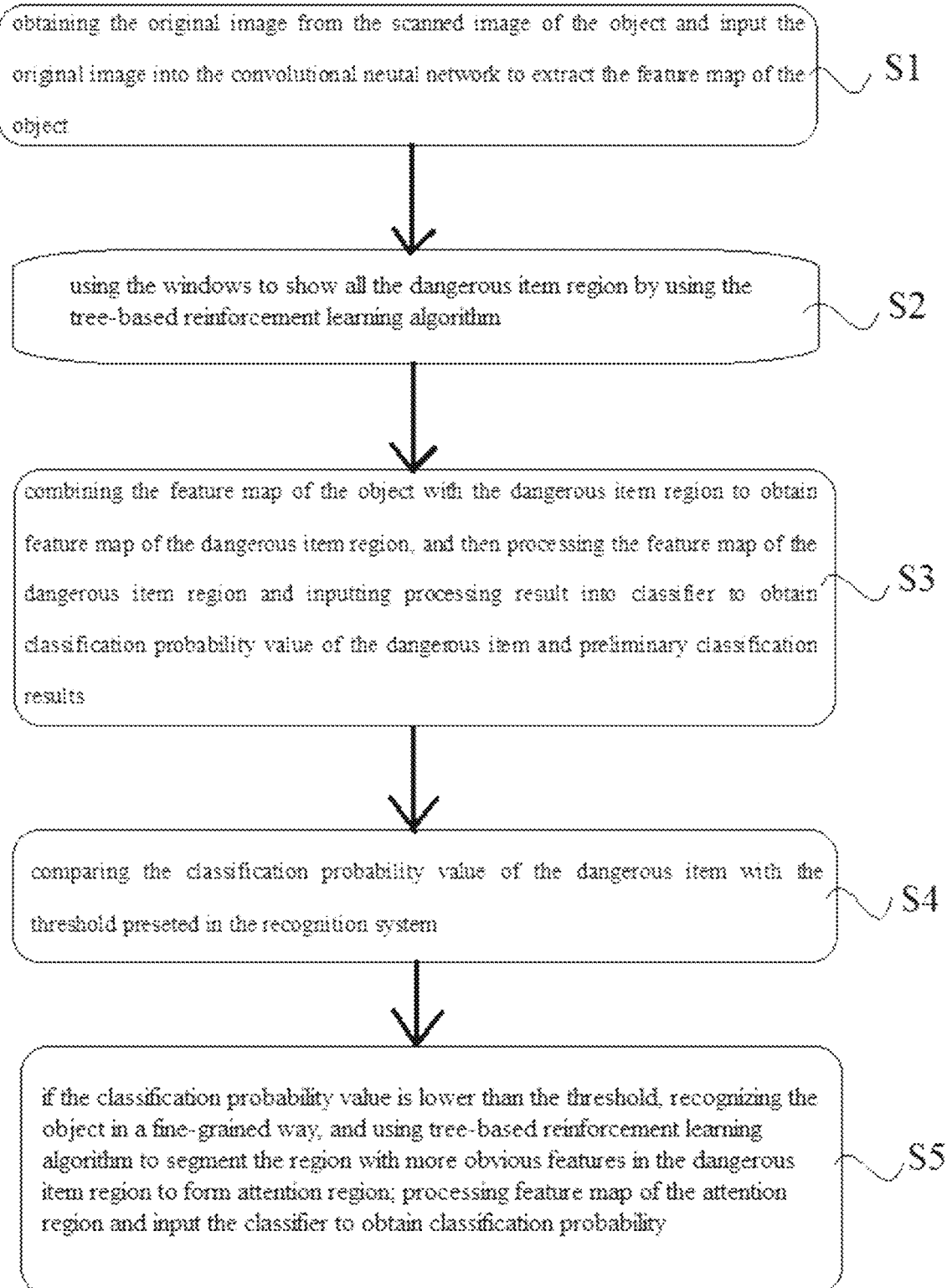
FIG. 2 is a flow diagram depicting the control method of the recognition system for security check of the present invention.
Figure 5:
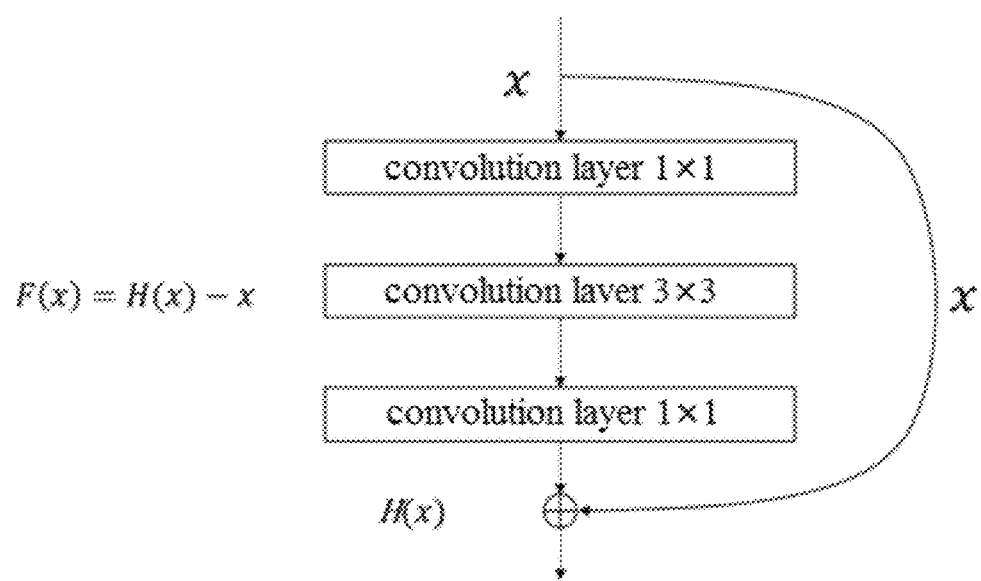
FIG. 5 is a schematic diagram depicting a three-layer residual learning unit of a residual network of the convolutional neural network.

Referring to FIG. 2, the present invention is also realized as a control method of the recognition system for security check for the recognition system as described above, the control method comprises the following steps:

S1: acquiring a scanned image of the object to generate an original image, and inputting the original image into a convolutional neural network to extract an object feature to obtain a feature map of the object;

S2: using windows to represent dangerous item region and using tree-based reinforcement learning algorithm; take the original image as the root of the tree, and take two types of actions as the branches of the tree to obtain two windows that form a tree structure; take the two windows as the root of the tree, and take two types of actions as branches of the tree to obtain four windows, and so on, until the windows show all the dangerous item regions; the tree-based reinforcement learning method can analyze one picture, generate and scale several rectangular windows, and finally divide out the region covered by the windows. Referring to FIG. 5, the gradient will disappear because of the deep network structure, the residual network is used to optimize the structure of the convolutional neural network, and the solid arc on the right side is used to represent the residual network. The residual network has an input of x and expected output of H(x), and the goal is to learn the difference between the output and the input, which is the residual. The residual is calculated as $F(x)=H(x)-x$. The integrity of the information is maintained by bypassing the input information directly to the output. That avoids the situation of the gradient disappearing, and the network can be better trained. In this embodiment, three elements of the tree-based reinforcement learning method are defined as:

State: the state is an abstract representation of the current environment. In the present invention, the state is defined as: feature maps of the current window, feature maps of the entire image, and history of actions.

Action: the action is the operation that can be performed in the current state. In the present invention, the action is divided into two broad categories: one type of action can simultaneously shrink the window in the horizontal and vertical direction, called left branch; another type of action can scale or translate the window in the horizontal or vertical direction, called right branch. There are five possible actions in the left branch: zoom out towards the top left corner, zoom out towards the bottom left corner, zoom out towards the top right corner, zoom out towards the bottom right corner, and zoom out toward the center, each time reducing to ¼ of the original window. There are 8 possible actions in the right branch: translate towards the right, translate towards the left, translate towards the bottom, translate towards the top, compress up and down, compress left and right, stretch up and down, stretch left and right, each time translating ¼ of the original window length, compressing to half of the original window area, stretching to 3/2 of the original window area. Through a series of actions, the dangerous items are placed in the region covered by the window. Using a one-dimensional vector of length 13 to represent the action and initialized to zero. If one of the above actions is taken, set the value corresponding to the action in the one-dimensional vector to 1. 1 means that the action is taken, and 0 means that the action is not taken. For example, (0,1,0,0,0,0,0,0,0,0,0,0,0) means taking the second action, which is zoom out towards the top right corner.

Figure 6:
FIG. 6 is a schematic diagram depicting the IoU (intersection over union)

Reward: the reward is the evaluation of the environment for taking certain action in the current state. In the present invention, the reward function is defined as:

$$r(s,a) = \begin{cases} +4, & \text{if } \max_{1 \le i \le n}(h_{i,t+1} - h_{i,t}) > 0 \\ \max_{1 \le i \le n} \text{sign}(IoU(W', T_i) - IoU(W, T_i)) & \text{otherwise} \end{cases}$$

where t represents the time, W represents the current window, W' represents the window of the next moment, $T_i$ represents the i th manually annotated region, and n represents that the frame image has n manually annotated regions. The function sign(x) equals to 1 when x>0, equals to 0 when x=0, and equals to −1 when x<0. Referring to FIG. 6, IoU represents the intersection over union, which shows the degree of similarity between two rectangular regions, and the calculation method of IoU is as follows:

$$IoU(W, T) = \frac{W \cap T}{W \cup T}$$

where W and T respectively represent two regions: the region contained in the white short line and the region contained in the black short dot interphase line in the figure; W∩T represents the area of the intersection of the two regions, which is the yellow transparent area in the middle of the figure; W∪T represents the area of the union of the two regions, which is the area contained by the red solid line in the figure. $h_{i,t}$ is a jump function:

$$h_{i,t} = \begin{cases} 1, & \text{if } IoU(W_t, T_i) > 0.6 \\ 0, & \text{otherwise} \end{cases}$$

This formula means that at time t, if the IoU between the window and the real region i is greater than 0.6, then $h_{i,t}$ is set to 1, otherwise, it is set to 0. Which shows that the judgment condition in the definition of the reward function:

$$\max_{1 \le i \le n}(h_{i,t+1} - h_{i,t}) > 0$$

indicates that the IoU between the current window and any manually annotated region is greater than 0.6 for the first time. For faster training, when the IoU between the current window and any manually annotated region is greater than 0.6 for the first time, the cumulative reward is +4.

The specific steps of the tree-based reinforcement learning method are: taking the window with the same size of the original image as the root node, selecting the network according to the policy, selecting one action from each of the two types of actions to adjust the current window, using the one-dimensional vector with a length of 13 to save the action record, and setting the two obtained windows as leaf nodes. All these constitute a tree structure. And then, taking the two leaf nodes as the root node respectively, selecting the network according to the policy, selecting one action in each of the two types of actions to adjust the current window, and setting the obtained window as a leaf node. Iterating through the above and get a history of actions. The stopping condition of the iteration is to segment the regions where all the dangerous items are located. The path from the root node to the leaf node is the flow of operation of segmenting out the dangerous item regions.

In the iterative process, the reward of each action can be obtained according to the calculation formula of the reward. The discovery data, which is the actions and corresponding rewards, is used to train a policy selection network. The policy selection network of the tree-based reinforcement learning is double deep Q-network based on competitive mechanism, which updates Q value each time when it explores. The Q value is the reference value of the selected action, and the greater the Q value for action in a state, the greater the likelihood that the action will be executed. The Q value is calculated based on the reward and the given policy. The system will select the action that produces the maximum Q value based on the input status. The Q value is defined as:

$$Q(s_t, a_t) = V(s_t) + A(a_t)$$

where $s_t$ represents the state at time t, $a_t$ represents the action taken at time t. The Q value is composed of two parts: one part is the value $V(s_t)$ of the static environmental state itself, called Value; the other part is the value $A(a_t)$ that is dynamically brought by the selection of an action, called Advantage. This constitutes the competitive deep Q-network. The goal of using competitive operations is to allow the network to separately calculate the Value of the environment itself and the Advantage of the choice of actions, the Advantage here is to compare an action with other actions, so it is designed to be zero mean. The motivation for using competitive operations is to make learning objectives clearer and to enhance the ability of deep Q-network to estimate the environment state.

The training process is divided into two networks, one is the target network $Q_{target}$ and the other is the main network $Q_{main}$. This design keeps the Q value stable and avoids overestimation. First, selecting the action corresponding to the maximum Q value in the main network, and then obtaining the corresponding Q value of the action on the target network. This training process can be:

$$Q_{main}(s_t, a_t) \rightarrow Q_{main}(s_t, a_t)$$

$$+ a(r_t + \gamma Q_{target}(s_{t+1}, \text{argmax}_a Q_{main}(s_{t+1}, a)) - Q_{main}(s_t, a_t))$$

where t represents the time; $Q(s_t, a_t)$ represents the Q value of action a in state s; a represents the learning rate, set to 0.1; $r_t$ represents the reward obtained by taking action $a_t$ in the state $s_t$, which can be calculated by the reward function; $\gamma$ represents the discount factor, set to 0.9; a represents the action taken in the state $s_{t+1}$;

After training, this method can quickly segment the regions where all the dangerous items are located according to the vector features of the entire image.

S3: combining the feature map of the object with the dangerous item region to obtain a feature map of the dangerous item region, and then processing the feature map of the dangerous item region and inputting processing result into a classifier to obtain classification probability value of the dangerous item and preliminary classification results.

The classifier consists of two fully connected layers and a softmax function. Due to the structural features of the fully connected layer, the number of parameters input to the fully connected layer needs to be fixed. However, because the size of the feature maps of the dangerous item regions is different, and the number of parameters generated varies, so it needs to be processed in advance. The region of interest pooling layer is used for processing, which makes the number of parameters ultimately input to the fully connected layer unchanged.

The region of interest pooling layer divides each candidate region into M×N blocks, and the pooling size is:

$$\left(\frac{m}{M}\right) \times \left(\frac{n}{N}\right).$$

In this way, the feature maps of different sizes are transformed into feature maps with the size of M×N. Max-pooling is used as the method of pooling, which means selecting the maximum value in each region. Finally, the size of the output feature map of the region of interest pooling layer is M×N. Where, setting M=4 and N=4, which generates the feature map with a size of 4×4×2048. The feature map is transformed into a one-dimensional vector and sent to the classifier.

The classifier consists of two fully connected layers and a softmax function. The generated one-dimensional vector is input into the two fully connected layers for weighted evaluation, and then the data is normalized by the softmax function to obtain the classification probability of the dangerous items. The classification probability is represented by a one-dimensional vector $p=(p_0, \ldots, p_x, \ldots, p_k)$. This vector has a total of K+1 elements, representing K+1 categories. Wherein, there are K dangerous item categories and one background category. $p_x$ represents the probability that this dangerous item is the category x, calculated as $p_x = f(w_c * X)$. Where, $W_c$ represents the weight, and $f( )$ represents the process of the classifier transforming the incoming feature vectors from the fully connected layer into the classification probability. In the classification probability, the item category corresponding to the maximum probability value is selected as the result of the preliminary classification. For example, the classification probability is $p=(0.01, 0.02, 0.87, 0.01, \ldots, 0.02)$, the third probability value is the largest, and the corresponding item category is a dagger, then the result of the preliminary classification of this region is a dagger.

The quality of the preliminary classification results of the system is evaluated by using a maximum likelihood estimate, that is, the loss of category x is obtained. The loss function of the category x is defined as $L(p,x)=-\log(p_x)$. After the loss is obtained, the parameters of the convolutional neural network in S1 and the parameters of the classifier in S3 are adjusted by the backpropagation algorithm RMSProp, which makes the preliminary classification results more accurate.

S4: threshold of the classification probability is preset in the recognition system for security check, judging the precision of the preliminary classification results and comparing the corresponding classification probability value with the threshold; the dangerous items are divided into three levels according to the danger index. The default settings are one-level dangerous items: guns, ammunition, restrained knives, etc.; two-level dangerous items: inflammable, explosive, toxicant, corrosive, radiation, infectious materials, pathogens, etc.; three-level dangerous items: kitchen knives other than restrained knives.

If the maximum value of the probability corresponding to K categories in the previous step is less than 0.85, that is, $$\max_{0 \le x \le k} p_x < 0.85$$

the next step is to take the fine-grained recognition step; or if the classification result belongs to the first two levels of the dangerous item levels, the next step is to take the fine-grained recognition step.

S5: if the classification probability value is lower than the threshold, recognizing the object in a fine-grained way, and using tree-based reinforcement learning algorithm to segment the region with more obvious features in the dangerous item region to form attention region; processing feature map of the attention region and input into the classifier to obtain classification probability.

Figure 7:
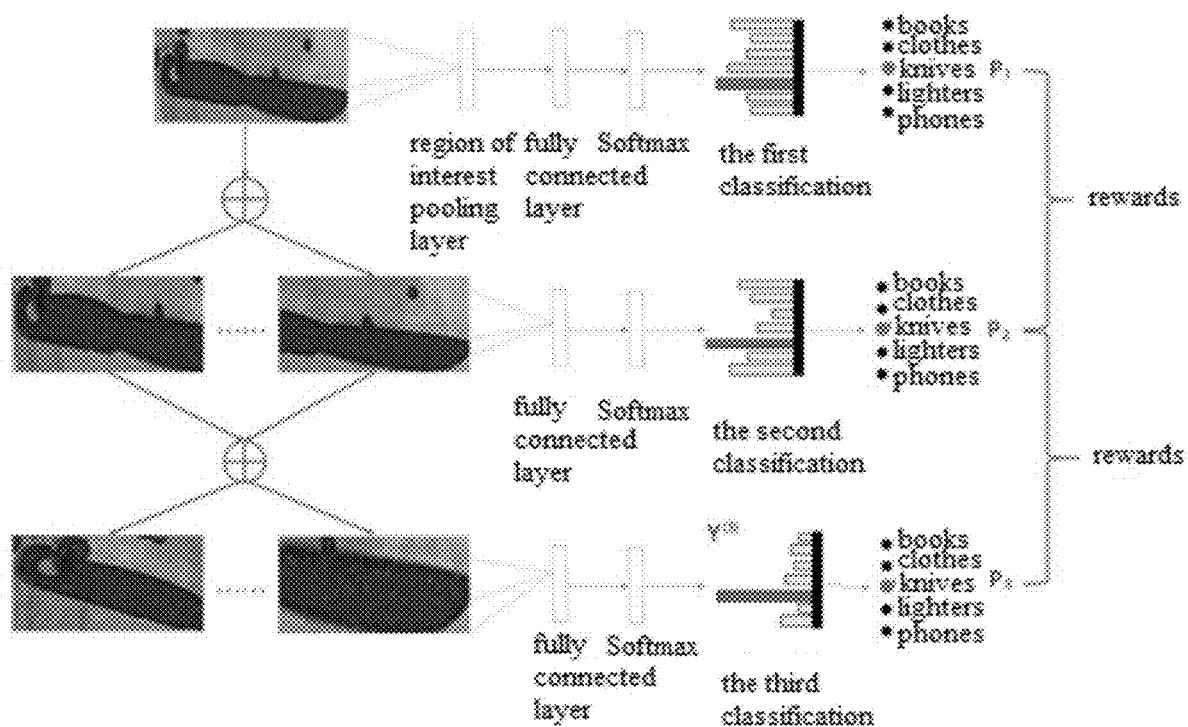
FIG. 7 is a schematic diagram depicting the fine-grained recognition network.

The purpose of fine-grained recognition is because the recognition accuracy of the dangerous items is highly required in a specific security inspection environment. Referring to FIG. 7, the main idea of this operation is to find the region with more dangerous item features in the dangerous item regions, which is called the attention region, and recognize the attention region to support the classification results. For example, find a more obvious blade region in the dagger regions to increase the probability that the items in this region are daggers. The input of this operation is a feature map with a size of 4×4×2048 obtained after processing by the pooling layer of the region of interest pooling layer in S3.

Tree-based reinforcement learning is also used to find the attention areas in the dangerous item region, but the status, actions, and rewards are different from each other, which are defined as:

State: feature maps of the current window, feature maps of the entire dangerous item region, the history of actions, and the classification probability calculated under the current window.

Action: divided into two broad categories: the left branch and the right branch. The action of the left branch can simultaneously reduce the window in the horizontal and vertical directions, so there are five possible actions: zoom out towards the upper left corner, zoom out towards the lower left corner, zoom out towards the upper right corner, zoom out towards the lower right corner, and zoom out toward the center, each time reducing to ¼ of the original window. The action of the right branch can translate the window in the horizontal or vertical directions, so there are four possible actions: translate towards the right, translate towards the left, translate towards the bottom, translate towards the top, each time translating ¼ of the original window length. The action is represented by a one-dimensional vector of length 9, and the specific implementation is the same as described above.

Reward: the reward function of this operation is defined as:

$$r(s,a)=\text{sign}(P_{t+i}-P_t)$$

where $P_t$ represents the maximum value of the classification probability after processing by the classifier at time t.

The specific steps of the tree-based reinforcement learning in the process of fine-grained recognition are as follows: taking the window with the same size of the dangerous item region as the root node, selecting the network according to the policy, selecting one action from each of the two types of actions to adjust the current window, and using the one-dimensional vector with a length of 9 to save the action record. Taking the region covered by the two windows as the input of the classifier to obtain the classification probability. Updating the policy selection network by obtaining the reward from taking the action in the current state according to the reward function. And then taking the two windows as the root node respectively to iterate the above operations. The iteration is stopped when the maximum classification probability is greater than 0.95 or the number of iterations reaches 5. After the iteration is stopping, outputting the dangerous item region and its corresponding category. The policy selection network here is the same as the previous design, and the training method is the same.

Before the training of the whole system, we need to collect enough security scanning images, manually select the items and label the categories of the items to form a data set. The data set is divided into a training set and test a set according to the 9:1 ratio. In the open-source deep learning framework tensorflow, installing a dependent package, and following the steps above to build the model. In order to be able to use the data set efficiently when training the system, a 50-layer deep residual network is built first and trained by using the ImageNet2016 data set. Next, the parameters of the trained network are used to initialize the parameters of each layer corresponding to the convolutional neural network in the security check system. Finally, the security check data set is used to perform 10,000 iterations of the security check system to fine-tune the parameters. In this way, we will get a security check system with excellent performance.

The recognition system for security checks of the invention can perform real-time detection at a speed of 2FPS on machines with normal performance. For old machines, the keyframe can be extracted to achieve the same purpose. The operation of the extracting keyframe is extracting an image of 1-3 frames from a 3-second shot as a keyframe, and taking the keyframe as the input of the subsequent operations. The specific operation of extracting keyframe is as follows:

Let $f$ represent a frame, $S=\{f_m|m=1,2,\ldots,N\}$ represent a shot with the length of 3 seconds and frames of N. Taking the first frame, the middle frame and the last frame as candidate keyframes, respectively expressed as $f_1$, $f_{\lfloor N/2 \rfloor}$, and $f_N$. The difference value between $f_i$ and $f_j$ is defined as:

$$D(f_i, f_j) = \sum_{x,y} |f_i(x, y) - f_j(x, y)|$$

where $f_i(x,y)$ represents the pixel with coordinate as (x, y) in the ith frame. When extracting the keyframes, first calculate the difference value between the candidate keyframes: $D(f_1, f_{\lfloor N/2 \rfloor})$, $D(f_1, f_N)$, $D(f_{\lfloor N/2 \rfloor}, f_N)$, and compare the difference value with the set threshold U, and determine the final keyframe according to the following rules:

1. If the three different values are smaller than U, which means the difference between the three candidate keyframes is small, and then take $f_{\lfloor N/2 \rfloor}$ as the keyframe;

2. If the three different values are larger than U, which means the difference between the three candidate keyframes is large, and then take all the three frames as the keyframe;

3. In other cases, take the two frames with the largest difference value as the keyframe.

In conclusion, the dangerous items are detected in more detail by providing a fine-grained recognition module in the system, which greatly improves the accuracy of the security check is. And accurately recognizing the dangerous items by reducing the unpacking inspection as much as possible improves the efficiency of security inspection, shortens the security inspection time, alleviates the congestion situation, saves human resources, and reduces the work pressure of security inspection staff.

Although the respective embodiments have been described one by one, it shall be appreciated that the respective embodiments will not be isolated. Those skilled in the art can appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Although the disclosure is illustrated and described herein with reference to specific embodiments, the disclosure is not intended to be limited to the details shown. Rather, various modifications may be made in the details within the scope and range of equivalents of the claims and without departing from the disclosure.

The invention claimed is:

1. A recognition system for security check, integrated with a reinforcement learning algorithm and an attention region proposal network, the recognition system for security check comprising the following modules:
   an object feature extraction module, the object feature extraction module being adapted for image scanning an object by using an X-ray machine to obtain an original image, and inputting the original image into a convolutional neural network to extract an object feature to obtain feature map of the object;
   a dangerous item region segmentation module, the dangerous item region segmentation module being adapted for using windows to represent the dangerous item region and using tree-based reinforcement learning algorithm; take the original image as the root of the tree, and take two types of actions as the branches of the tree to obtain two windows that form a tree structure; take the two windows as the root of the tree, and take two types of actions as branches of the tree to obtain four windows, and so on, until the windows show all the dangerous item regions;
   a preliminary classification module, the preliminary classification module being adapted for combining the feature map of the object with the dangerous item region to obtain feature map of the dangerous item region, and then processing the feature map of the dangerous item region and inputting processing result into a classifier to obtain classification probability value of the dangerous item and preliminary classification results;

a preliminary classification result determination module, the preliminary classification result determination module being adapted for presetting a threshold of the classification probability in the recognition system for security check, judging the precision of the preliminary classification results and comparing the corresponding classification probability value with the threshold; and a fine-grained recognition module, the fine-grained recognition module being adapted for, if the classification probability value is lower than the threshold, recognizing the object in a fine-grained way, and using tree-based reinforcement learning algorithm to segment the region with more obvious features in the dangerous item region to form attention region;

processing feature map of the attention region and input into the classifier to obtain classification probability.

2. The recognition system according to claim 1, wherein the convolutional neural network comprises a large convolution kernel for increasing the region of the receptive field so as to make the extracted object features more comprehensive for accurate learning, a small convolution kernel for accurately learning object edges and other detail features and reducing a large number of redundant parameters, and a convolution filter for deepening and widening the dimensionality reduction of network structure.

3. The recognition system according to claim 1, wherein in the preliminary classification module, the feature map of the dangerous item region is input to a pooling layer for processing, and the classifier includes softmax function.

4. The recognition system according to claim 1, wherein the fine-grained recognition module uses a recurrent attention region generation network, and continues to segment according to the attention region and classification probability to form a more detailed attention region and generate the classification probability, continues to iterate until the predetermined target or upper limit of the number of cycles is reached, and the loop is stopped to obtain the final recognition result.

* * * * *